United States Patent
Guo et al.

(10) Patent No.: US 10,776,583 B2
(45) Date of Patent: Sep. 15, 2020

(54) ERROR CORRECTION FOR TABLES IN DOCUMENT CONVERSION

(71) Applicant: INTERNATIONAL BUSINESS MACHINES CORPORATION, Armonk, NY (US)

(72) Inventors: HongLei Guo, Beijing (CN); Li Zhang, Beijing (CN); Changhua Sun, Beijing (CN); Birgit M. Pfitzmann, Zürich (CH); Shiwan Zhao, Beijing (CN); Zhong Su, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 123 days.

(21) Appl. No.: 16/185,809

(22) Filed: Nov. 9, 2018

(65) Prior Publication Data

US 2020/0151252 A1 May 14, 2020

(51) Int. Cl.
*G06F 17/27* (2006.01)
*G06F 40/30* (2020.01)
(Continued)

(52) U.S. Cl.
CPC ........... *G06F 40/30* (2020.01); *G06F 40/174* (2020.01); *G06F 40/183* (2020.01); (Continued)

(58) Field of Classification Search
CPC ...... G06F 40/177; G06F 40/131; G06F 40/14; G06F 40/18; G06F 40/232; G06F 40/30;
(Continued)

(56) References Cited

U.S. PATENT DOCUMENTS

| 8,150,161 | B2 * | 4/2012 | Laaser | G06K 9/03 |
| | | | | 382/186 |
| 8,468,244 | B2 * | 6/2013 | Redlich | G06Q 10/06 |
| | | | | 709/225 |
| 8,468,813 | B2 * | 6/2013 | Hill | F01N 1/166 |
| | | | | 60/324 |
| 8,543,573 | B2 * | 9/2013 | MacPherson | G06T 11/206 |
| | | | | 707/736 |

(Continued)

OTHER PUBLICATIONS

Huang et al., "Auto-Detect: Data-Driven Error Detection in Tables", Proceedings of the 2018 International Conference on Management of Data. May 27, 2018. pp. 1377-1392.
(Continued)

*Primary Examiner* — Vijay B Chawan
(74) *Attorney, Agent, or Firm* — Tutunjian & Bitetto, P.C.; Joseph Petrokaitis

(57) ABSTRACT

A method is presented for error correction of tabular data in document conversion. The method includes identifying errors from tabular data transformation by employing an error/invalidation checking module and correcting the identified errors from the tabular data transformation by employing an error correction module. The error correction module includes identifying a main structure pattern from common row structures, concatenating separate keywords according to natural language processing models employing training data obtained from a plurality of candidate tabular data, adjusting cells in the tabular data based on a domain-specific knowledge database including the training data in combination with linguistic and semantic knowledge, merging partial tabular data pieces, and generating an adjusted table as output on a display of a computing device.

20 Claims, 6 Drawing Sheets

(51) Int. Cl.
*G06F 40/279* (2020.01)
*G06F 40/183* (2020.01)
*G06F 40/174* (2020.01)
*G06F 40/177* (2020.01)
*G10L 15/22* (2006.01)
*G06F 3/0484* (2013.01)
*G06F 16/21* (2019.01)

(52) U.S. Cl.
CPC ........ *G06F 40/279* (2020.01); *G06F 3/04842* (2013.01); *G06F 16/21* (2019.01); *G06F 40/177* (2020.01); *G10L 15/22* (2013.01)

(58) Field of Classification Search
CPC ...... G06F 40/40; G06F 16/21; G06F 16/2365; G06F 16/93; G06F 3/04842; G06F 3/04847; G06F 3/0488; G06N 5/02; G06N 7/005; G10L 15/22; G10L 15/26; G10L 17/005
USPC ........... 704/9, 257, 231, 275, 270.1; 706/52; 705/321, 342; 707/736, 758, 793, 707/999.103; 709/225, 229, 246; 715/255; 726/26
See application file for complete search history.

(56) References Cited

U.S. PATENT DOCUMENTS

| | | | | |
|---|---|---|---|---|
| 8,873,813 | B2* | 10/2014 | Tadayon | G06K 9/00 382/118 |
| 9,569,417 | B2* | 2/2017 | Byron | G06F 16/2365 |
| 2009/0063557 | A1* | 3/2009 | MacPherson | G06N 5/02 |
| 2014/0079297 | A1* | 3/2014 | Tadayon | G06K 9/00288 382/118 |
| 2014/0201126 | A1* | 7/2014 | Zadeh | A61B 5/165 706/52 |
| 2015/0134555 | A1* | 5/2015 | Fancher | G06Q 10/1053 705/321 |
| 2015/0142418 | A1* | 5/2015 | Byron | G06F 40/232 704/9 |
| 2016/0055376 | A1* | 2/2016 | Koduru | G06F 40/14 382/176 |
| 2017/0289341 | A1* | 10/2017 | Rodriguez | G10L 17/005 |

OTHER PUBLICATIONS

Liu et al., "Improving the Table Boundary Detection in PDFs by Fixing the Sequence Error of the Sparse Lines", 10th International Conference on Document Analysis and Recognition. Jul. 26, 2009. pp. 1006-1010.

* cited by examiner

300 ↘

|  | 310 | 320 | 330 | 340 | 350 | 360 | 370 |
|---|---|---|---|---|---|---|---|
|  | Category | Number of Physical Servers | Number of Virtual Servers | Total Number of Servers | Number of Physical Servers | Number of Virtual Servers | Total Number of Servers |
| 302 | AIX | 20 | 20 | 40 | 10 | 32 | 42 |
| 304 | Solaris | 45 | 20 | 65 | 46 | 10 | 46 |
| 306 | ESX | 20 | 10 | 30 | 12 | 20 | 32 |

| # | Category | Number of Physical Servers | Number of Virtual Servers | Total Number of Servers | Number of Physical Servers | Number of Virtual Servers | Total Number of Servers |
|---|---|---|---|---|---|---|---|
| 1 | AIX | 20 | 20 | 40 | 10 | 32 | 42 |
|  | Solaris | 45 | 20 | 65 | 45 | 10 | 46 |
| 3 | ESX | 2 | 10 | 30 | 12 | 20 | 32 |

⭐ Error

FIG. 4

ERROR CORRECTION FOR TABLES IN DOCUMENT CONVERSION

BACKGROUND

Technical Field

The present invention relates generally to an improved data processing apparatus and method, and more specifically, to error correction for tables in document conversion.

Description of the Related Art

Documents include information in many forms. For example, textual information arranged as sentences and paragraphs conveys information in a narrative form. However, some types of information are presented in a tabular organization. For example, a document can include tables for presenting financial information, organizational information, and more generally, any data items that are related to one another through some relationship. Natural language processing (NLP) is a technique that facilitates exchange of information between humans and data processing systems. For example, one branch of NLP pertains to transforming a given content into a human-usable language or form. For example, NLP can accept a document whose content is in a computer-specific language or form, and produce a document whose corresponding content is in a human-readable form.

SUMMARY

In accordance with an embodiment, a method is provided for error correction of tabular data in document conversion. The method includes identifying errors from tabular data transformation by employing an error/invalidation checking module and correcting the identified errors from the tabular data transformation by employing an error correction module. The error correction module includes identifying a main structure pattern from common row structures, concatenating separate keywords according to natural language processing models employing training data obtained from a plurality of candidate tabular data, adjusting cells in the tabular data based on a domain-specific knowledge database including the training data in combination with linguistic and semantic knowledge, merging partial tabular data pieces, and generating an adjusted table as output on a display of a computing device.

In accordance with another embodiment, a system is provided for error correction of tabular data in document conversion. The system includes an error/invalidation checking module to identify errors from tabular data transformation and an error correction module to correct the identified errors from the tabular data transformation, the error correction module configured to identify a main structure pattern from common row structures, concatenate separate keywords according to natural language processing models employing training data obtained from a plurality of candidate tabular data, adjust cells in the tabular data based on a domain-specific knowledge database including the training data in combination with linguistic and semantic knowledge, merge partial tabular data pieces, and generate an adjusted table as output on a display of a computing device.

In accordance with yet another embodiment, a non-transitory computer-readable storage medium comprising a computer-readable program for error correction of tabular data in document conversion is presented. The non-transitory computer-readable storage medium performs the steps of identifying errors from tabular data transformation by employing an error/invalidation checking module and correcting the identified errors from the tabular data transformation by employing an error correction module. The error correction module includes identifying a main structure pattern from common row structures, concatenating separate keywords according to natural language processing models employing training data obtained from a plurality of candidate tabular data, adjusting cells in the tabular data based on a domain-specific knowledge database including the training data in combination with linguistic and semantic knowledge, merging partial tabular data pieces, and generating an adjusted table as output on a display of a computing device.

It should be noted that the exemplary embodiments are described with reference to different subject-matters. In particular, some embodiments are described with reference to method type claims whereas other embodiments have been described with reference to apparatus type claims. However, a person skilled in the art will gather from the above and the following description that, unless otherwise notified, in addition to any combination of features belonging to one type of subject-matter, also any combination between features relating to different subject-matters, in particular, between features of the method type claims, and features of the apparatus type claims, is considered as to be described within this document.

These and other features and advantages will become apparent from the following detailed description of illustrative embodiments thereof, which is to be read in connection with the accompanying drawings.

BRIEF DESCRIPTION OF THE SEVERAL VIEWS OF THE DRAWINGS

The invention will provide details in the following description of preferred embodiments with reference to the following figures wherein:

FIG. 3 is a block/flow diagram of an exemplary table to be converted to another format;

FIG. 4 is a block/flow diagram of the exemplary table converted to another format and including a plurality of errors due to the conversion;

Throughout the drawings, same or similar reference numerals represent the same or similar elements.

DETAILED DESCRIPTION

Embodiments in accordance with the present invention provide methods and devices for performing error correction for tables or tabular data in document conversion. A first document including tabular data needs to be converted from a first format to a second format. In one example, a portable document format (PDF) document needs to be converted to a WORD format document. When the conversion takes place, table information in the PDF document may not be accurately extracted due to the complex nature of tables, thus resulting in transfer errors. These transfer errors can render the table in the second format unreadable.

Embodiments in accordance with the present invention provide methods and devices for reducing the impact of the errors from table transformation to table information extraction by employing an error/invalidation checking component and an error correction component. The error/invalidation checking component can identify potential errors from table transformation. The errors can include, e.g., meaningless cell text strings, cell value inconsistencies, and structure inconsistencies. The error correction component can identify the main pattern from common row structures, can concatenate separate keywords and segments according to language models and context, can adjust cells based on concept and relations from a knowledge database, can merge partial tables pieces, and can generate an adjusted table as output on a display of a computing device.

It is to be understood that the present invention will be described in terms of a given illustrative architecture; however, other architectures, structures, substrate materials and process features and steps/blocks can be varied within the scope of the present invention. It should be noted that certain features cannot be shown in all figures for the sake of clarity. This is not intended to be interpreted as a limitation of any particular embodiment, or illustration, or scope of the claims.

Figure 1:
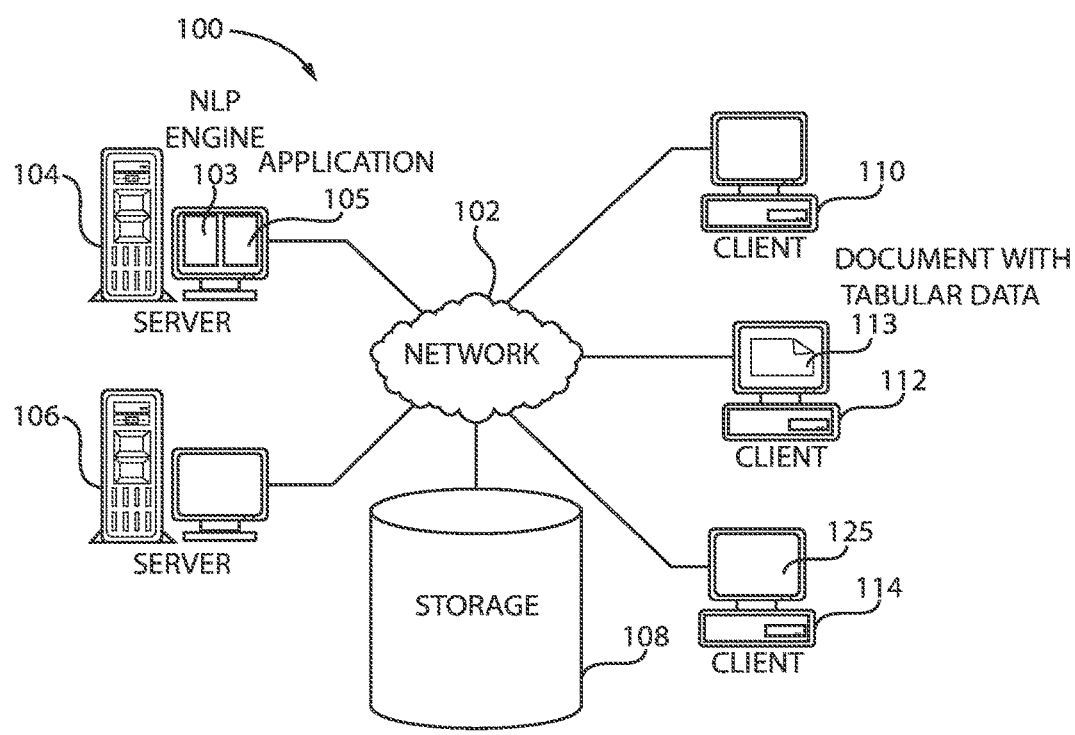
FIG. 1 is a block/flow diagram depicting an exemplary pictorial representation of a network of data processing systems, in accordance with embodiments of the present invention.

FIG. 1 depicts a pictorial representation of a network of data processing systems in which illustrative embodiments can be implemented. Data processing environment 100 is a network of computers in which the illustrative embodiments can be implemented. Data processing environment 100 includes network 102. Network 102 is the medium used to provide communications links between various devices and computers connected together within data processing environment 100. Network 102 can include connections, such as wire, wireless communication links, or fiber optic cables. Server 104 and server 106 couple to network 102 along with storage unit 108. Software applications can execute on any computer in data processing environment 100.

In addition, clients 110, 112, and 114 couple to network 102. A data processing system, such as server 104 or 106, or client 110, 112, or 114 can include data and can have software applications or software tools executing thereon.

Only as an example, and without implying any limitation to such architecture, FIG. 1 depicts certain components that are usable in an example implementation of an embodiment. For example, Application 105 in server 104 is an implementation of an embodiment described herein. Application 105 operates in conjunction with Natural Language Processing (NLP) engine 103. NLP engine 103 can be, for example, an existing application capable of performing natural language processing on documents, and can be modified or configured to operate in conjunction with application 105 to perform an operation according to an embodiment described herein. Client 112 includes document with tabular data 113 that is processed according to an embodiment.

Servers 104 and 106, storage unit 108, and clients 110, 112, and 114 can couple to network 102 using wired connections, wireless communication protocols, or other suitable data connectivity. Clients 110, 112, and 114 can be, for example, personal computers or network computers. In the depicted example, server 104 can provide data, such as boot files, operating system images, and applications to clients 110, 112, and 114. Clients 110, 112, and 114 can be clients to server 104 in this example. Clients 110, 112, 114, or some combination thereof, can include their own data, boot files, operating system images, and applications. Data processing environment 100 can include additional servers, clients, and other devices that are not shown.

In the depicted example, data processing environment 100 can be the Internet. Network 102 can represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also can be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 can be used for implementing a client-server environment in which the illustrative embodiments can be implemented. A client-server environment enables software applications and data to be distributed across a network such that an application functions by using the interactivity between a client data processing system and a server data processing system. Data processing environment 100 can also employ a service oriented architecture where interoperable software components distributed across a network can be packaged together as coherent business applications.

Figure 2:
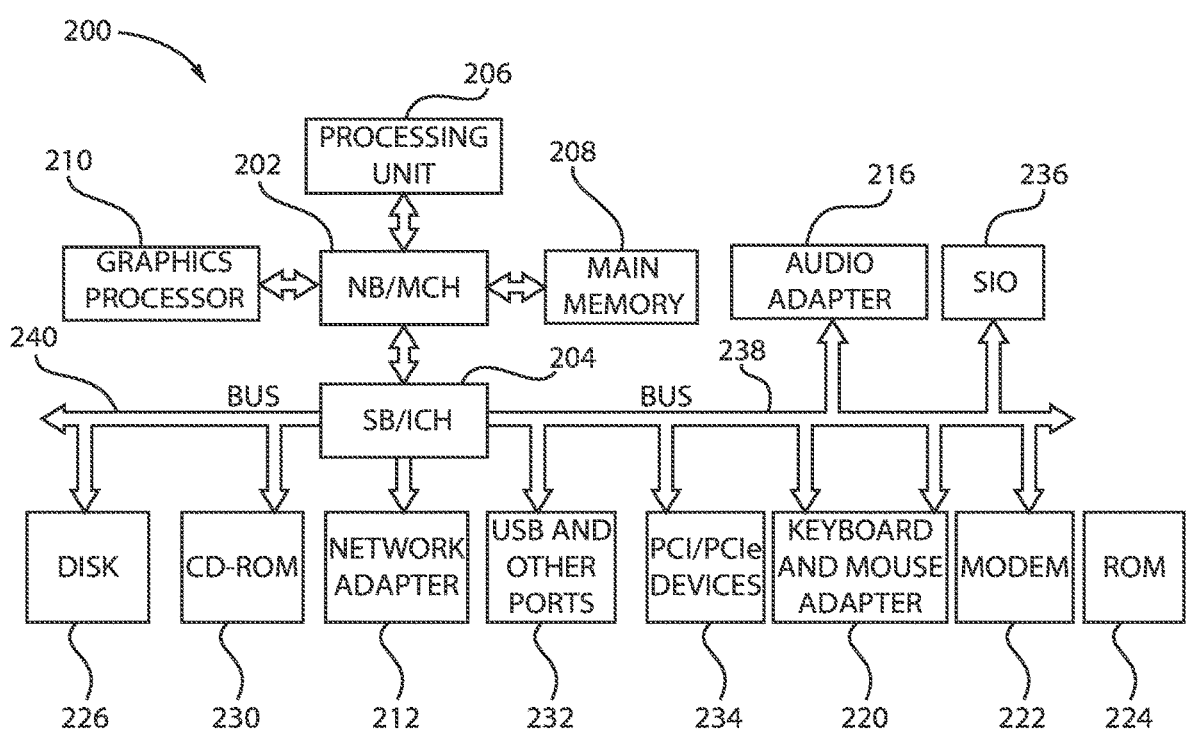
FIG. 2 is a block/flow diagram depicting an exemplary block diagram of a data processing system, in accordance with an embodiment of the present invention.

With reference to FIG. 2, this figure depicts a block diagram of a data processing system in which illustrative embodiments can be implemented. Data processing system 200 is an example of a computer, such as server 104 or client 112 in FIG. 1, or another type of device in which computer usable program code or instructions implementing the processes can be located for the illustrative embodiments.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 can include one or more processors and can be implemented using one or more heterogeneous processor systems. Processing unit 206 can be a multi-core processor. Graphics processor 210 can be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) 226 and CD-ROM 230 are coupled to South Bridge and I/O controller hub 204 through bus 240. PCI/PCIe devices 234 can include, for example, Ethernet adapters, add-in cards, and PC cards for notebook computers. PCI uses a card bus controller, while PCIe does not. ROM 224 can be, for example, a flash binary input/output system (BIOS). Hard disk drive 226 and CD-ROM 230 can use, for example, an integrated drive electronics (IDE) or serial advanced technology attachment (SATA) interface. A super I/O (SIO) device 236 can be coupled to South Bridge and I/O controller hub (SB/ICH) 204 through bus 238.

Memories, such as main memory 208, ROM 224, or flash memory (not shown), are some examples of computer usable storage devices. Hard disk drive 226, CD-ROM 230, and other similarly usable devices are some examples of computer usable storage devices including computer usable storage medium.

An operating system runs on processing unit 206. The operating system coordinates and provides control of various components within data processing system 200 in FIG. 2. The operating system can be a commercially available operating system such as AIX® (AIX is a trademark of International Business Machines Corporation in the United States and other countries), Microsoft® Windows® (Microsoft and Windows are trademarks of Microsoft Corporation in the United States and other countries), or Linux® (Linux is a trademark of Linus Torvalds in the United States and other countries). An object oriented programming system, such as the Java™ programming system, can run in conjunction with the operating system and provides calls to the operating system from Java™ programs or applications executing on data processing system 200 (Java and all Java-based trademarks and logos are trademarks or registered trademarks of Oracle Corporation and/or its affiliates).

Instructions for the operating system, the object-oriented programming system, and applications or programs, such as application 105 in FIG. 1, are located on at least one of one or more storage devices, such as hard disk drive 226, and can be loaded into at least one of one or more memories, such as main memory 208, for execution by processing unit 206. The processes of the illustrative embodiments can be performed by processing unit 206 using computer implemented instructions, which can be located in a memory, such as, for example, main memory 208, read only memory 224, or in one or more peripheral devices.

The hardware in FIGS. 1-2 can vary depending on the implementation. Other internal hardware or peripheral devices, such as flash memory, equivalent non-volatile memory, or optical disk drives and the like, can be used in addition to or in place of the hardware depicted in FIGS. 1-2. In addition, the processes of the illustrative embodiments can be applied to a multiprocessor data processing system.

In some illustrative examples, data processing system 200 can be a personal digital assistant (PDA), which is generally configured with flash memory to provide non-volatile memory for storing operating system files and/or user-generated data. A bus system can include one or more buses, such as a system bus, an I/O bus, and a PCI bus. Of course, the bus system can be implemented using any type of communications fabric or architecture that provides for a transfer of data between different components or devices attached to the fabric or architecture.

A communications unit can include one or more devices used to transmit and receive data, such as a modem or a network adapter. A memory can be, for example, main memory 208 or a cache, such as the cache found in North Bridge and memory controller hub 202. A processing unit can include one or more processors or CPUs.

The depicted examples in FIGS. 1-2 and above-described examples are not meant to imply architectural limitations. For example, data processing system 200 also can be a tablet computer, laptop computer, or telephone device in addition to taking the form of a PDA.

FIG. 3 is a block/flow diagram of an exemplary table to be converted to another format.

With reference to FIG. 3, an example of tabular data is illustrated within which functional dependencies can be identified in accordance with an illustrative embodiment. Table 300 is an example of tabular data appearing in document 113 displayed on display 125 in FIG. 1 within which functional dependencies can be determined using application 105 in FIG. 1, for example.

Table 300 includes a plurality of columns and a plurality of rows. The plurality of columns can be, e.g., a category column 310, a number of physical servers column 320, a number of virtual servers column 330, a total number of servers column 340, a number of physical servers column 350, a number of virtual servers column 360, and a total number of servers column 370. The plurality of rows can be, e.g., an AIX row 302, a Solaris row 304, and a ESX row 306. Table 300 can be in a first format. For example, table 300 can be included in a PDF document.

The horizontal or vertical rule-lines are depicted for bounding a table and cell only as an example without implying a limitation thereto. A table or tabular data can be expressed in any suitable manner, and a cell can be demarcated in any manner within the scope of the illustrative embodiments. For example, indentation, spacing between cell data, different spacing in tabular and non-tabular content, symbols, graphics, a specific view or perspective to illustrate tabular data, or a combination of these and other example manners of expressing tabular data and cells therein are contemplated within the scope of the illustrative embodiments.

The illustrative embodiments are described with respect to certain documents and tabular data only as examples. Such documents, tabular data, or their example attributes are not intended to be limiting to the invention. Furthermore, the illustrative embodiments can be implemented with respect to any type of data, data source, or access to a data source over a data network. Any type of data storage device can provide the data to an illustrative embodiment of the present invention, either locally at a data processing system or over a data network, without departing from the spirit and scope of the illustrative embodiments.

Table 300 includes several headers that serve to organize the data in the various cells into headings, categories, or classifications (categories). The headers can be row-headers or column headers. The headers are not limited to the table boundaries or extremities within the scope of the illustrative embodiments. For example, a header can be embedded within a table, between cells, such as in the form of a sub-header, for example, to identify a sub-category of tabular data. Such sub-row or sub-column headers are contemplated within the scope of the illustrative embodiments. In one embodiment, certain header information can be specified separately from the corresponding tabular data, such as in a footnote, appendix, another table, or another location in a given document.

FIG. 4 is a block/flow diagram of the exemplary table converted to another format and including a plurality of errors resulting from the conversion.

Table 300 (FIG. 3) needs to be converted to another format. In one instance, table 300 in PDF format needs to be converted to a WORD format document. The table conversion takes place and the converted table 400 can include a plurality of errors resulting from the conversion of table 300 (FIG. 3) from, e.g., a PDF document to a WORD document. The various errors are designated as 420, 422, 430 and highlighted by a star.

In one example, text from one cell can be wrongly split into multiple cells.

In one instance, a word exists neither in general nor domain dictionary, e.g., "numbe" and "r." Thus, the word "number" is incorrectly split into two cells. In particular, this can occur for the first or last word in the cell. Either the first few letters of a word or the last few letters of a word can be incorrectly split into multiple cells.

In another instance, a word ending in hyphen (single or last word). For example, the word "build-up" can be incorrectly split into two cells as "build" and "up."

In another instance, a word can be incorrectly combined with an adjacent word (possibly skipping blank cells).

In another instance, an ungrammatical phrase, e.g., "number of" or "of servers" can be incorrectly created. In particular, combining words in adjacent cells can lead to grammatical phrase errors.

However, if it is in a front column (or top row) and multiple later columns (or rows) form good complements, it can be intentional (e.g., "number of—CPUs, disks, ports").

It is also noted that any state-of-the-art Part-of-Speech (PoS) tagger can be used, as further described below with reference to FIG. 7. Additionally, a state-of-the-art grammar parser can have to be relaxed in what it considers correct grammar. In one example, noun phrases like "Number of servers" are common in table headings.

In another example, text from several cells can be wrongly combined into one cell.

In one instance, a non-existing word in the middle of a cell can be incorrectly split into two known words. In another instance, an ungrammatical phrase can be split into two grammatical phrases.

In another example, cell value inconsistency can be detected in each row/column. In other words, there can be a misplacement of cell values.

First cells in a row or column are excluded. The next and last cells also have to be treated with caution, in particular if there are wrongly split cells.

If most of the other cells in a row or column have the same format, e.g., number, date, word, then there could be others that do not have the same format.

"Format" can be extended to semantic categories like "Person," "First name," or "possible percentage." For words, such as "same format," they can be extended by word vectors to judge similarity of meaning by vector distance.

For example, such methods find small distances between the operating systems AIX, Solaris, etc. in one of the example tables, and a large distance to "Total."

Here the word "Total" is not misplaced, but indicates caution in handling of the last row.

In particular if the cell with different format fits the format of a neighboring row or column.

For example, the "ESX" in the error example does not fit its current number column, but fits the preceding text column, even by a small distance to its word vectors.

As a result, follow-up analysis is needed to determine whether the entire row or column has to be shifted, as discussed below.

Figure 5:
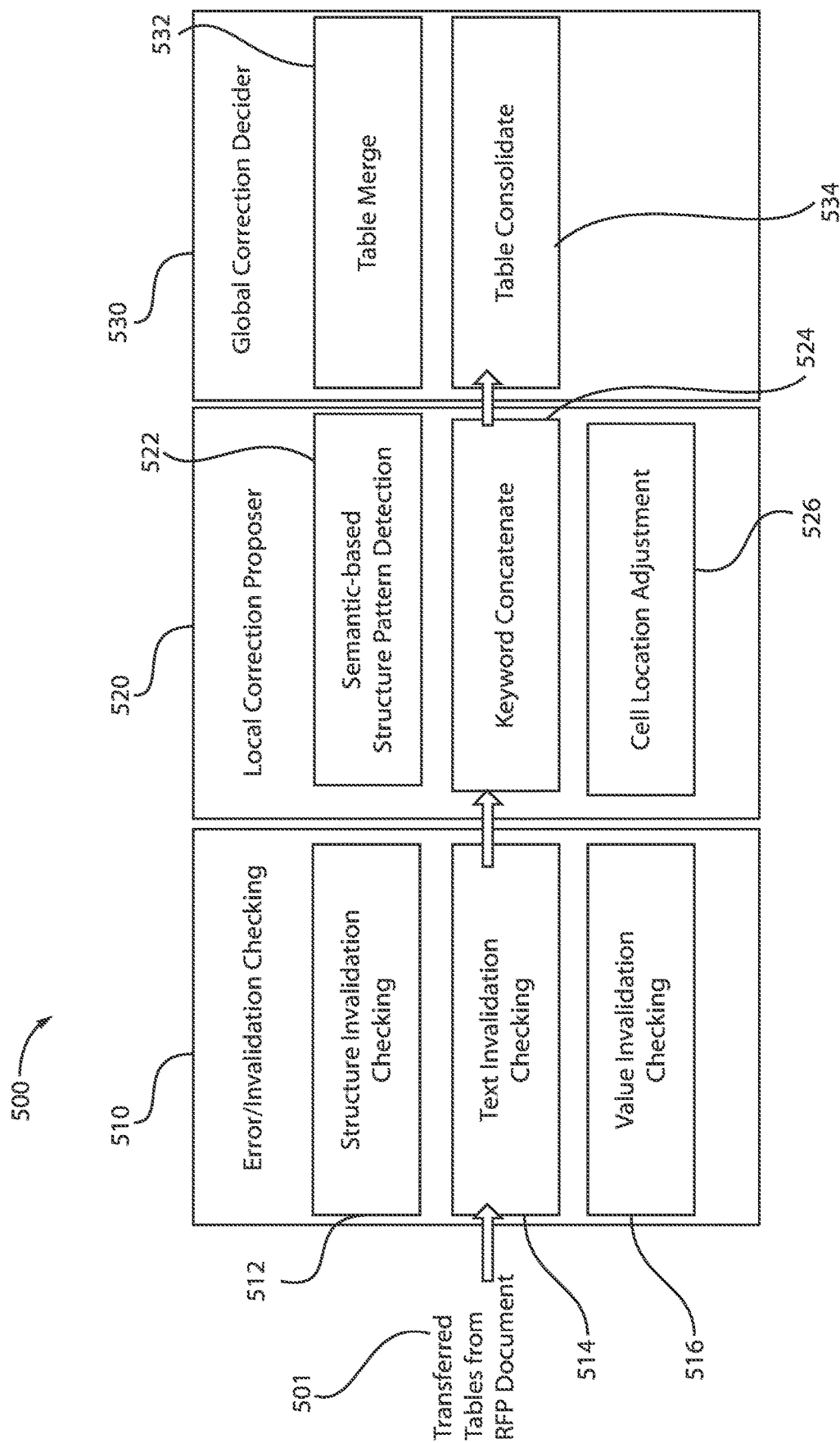
FIG. 5 is a block/flow diagram of a system architecture for performing error correction in tables, in accordance with an embodiment of the present invention.

FIG. 5 is a block/flow diagram of a system architecture for performing error correction in tables, in accordance with an embodiment of the present invention.

The system architecture 500 includes an error/invalidation checking module 510, a local correction proposer 520, and a global correction decider 530.

A document 501 is fed into the system architecture 500 to be processed by the error/invalidation checking module 510, the local correction proposer 520, and the global correction decider 530. The document 501 can be, e.g., a request for proposal (RFP) document including a plurality of tables or tabular data.

An RFP is a document that solicits a proposal, often made through a bidding process, by an agency or company interested in procurement of a commodity, service or valuable asset, to potential suppliers to submit business proposals. Baseline/NFR (non-functional requirement) extraction from RFP is an important task when dealing with RFP documents. The task is to identify the key index objects of the proposal. Baseline/NFR extraction accepts the text content from the RFP document and returns the list of baselines, as well as the associated key values. RFP can be in various formats, but often is in Adobe PDF format. Hence, for baseline extraction, the preprocess of getting text content of RFP document is necessary.

The error/invalidation checking module 510 includes a structure invalidation checking component 512, a text invalidation checking component 514, and a value invalidation checking component 516.

The local correction proposer 520 includes a semantic-based structure pattern detection component 522, a keyword concatenate component 524, and a cell location adjustment component 526.

The global correction decider 530 includes a table merge component 532 and a table consolidate component 534.

Therefore, to maximally reduce the impact of the error from table transformation to table information extraction, a method and approach of error checking for table in document conversion is introduced including an error/invalidation checking component for identifying the potential error or errors from table transformation. The error types can be, e.g., meaningless cell text strings, text string from one cell is wrongly split into multiple cells, text string from several cells are wrongly combined into one cell, cell value inconsistency in each row/column (e.g., misplacement of cell value), and structure inconsistency (e.g., number inconsistency, blank cells, etc.). The error correction component can include identifying the main pattern from the common row structures, concatenating separate keywords/segments according to language model and context, adjusting cells based on concept and relations from a knowledge database, merging partial table pieces into one, and generating the adjusted table as output to a display of a computing device.

The key is that besides structural information from the PDF code, and/or geometric analysis, the exemplary embodiments of the present invention employ natural-language processing and even domain-specific knowledge to repair tables, as described in FIGS. 7-9 below. Domain-specific components treat domain-relevant tables in the input documents better than other tables. For example, where a user is interested in baselines and NFRs, if the same PDF includes a table of the products the external parties produce, it is fine if that later table is less well analyzed than actual baseline and NFR tables. Hence, domain knowledge can be employed to improve the table correction.

Regarding structure inconsistency:

Merged or split cells can legitimately occur, but also as part of a wrong extraction.

Merging is quite common in header rows or columns, in particular if a second header row or columns with individual filled cells follow. The second header row is recognized by format differences from the remaining rows.

Later splits without the header, as in the column with the "20" after "ESX" in the example, is likely an error (FIG. 4, elements 420, 422).

In certain instances, long tables in highly tabular document formats have intermediate headings. Single very different rows in such tables have to be tentatively considered.

Blank cells can legitimately occur in tables, but can also indicate misalignment.

In the table body, and if no other inconsistencies in the same row or column have been found, a blank cell is fine with a high likelihood. The error likelihood rises if it is the only blank cell, or all but one cells are blank, in a table area.

If there are other inconsistencies, then blank cells can indicate how the realignment has to be done. In one example, non-blank cells can be shifted into blank cells.

Blank cells in header rows and columns are unusual, in particular in the last row or column in multi-row or multi-column headers. It is thus likely that some wrong cell-breaks or shifts occurred, as in the header of the example table (FIG. 4, element 430).

Heading-to-cell misalignment:

If a user has a domain ontology or knowledge base, it is possible to validate (at least for some tables) whether heading and values fit together. For example, "number of" should be followed by numbers, "growth" by percentages, and a header with a yearly or monthly succession (as in the first examples above) is likely to include a somewhat smooth sequence of numbers.

Most local correction options have been described above together with the detection.

At the end, these options have to be combined into one or more global table updates.

For example, joining cell texts that were wrongly split can be combined to either of the initial cells (or a merged cell). This causes new blank cells that have to be handled.

Blank cells could get content from either side.

Moreover, solution alternatives can be judged by at least two criteria:

The first criteria is a number or weighted likelihood of remaining possible inconsistencies (such as strange texts, blank cells) in the corrected table. The second criteria is number of changes needed to produce the corrected table. A final table is selected by a weighted sum of these criteria. Tables where this weighted sum is above a predetermined threshold can be flagged for human or user or manual post-processing.

Figure 6:
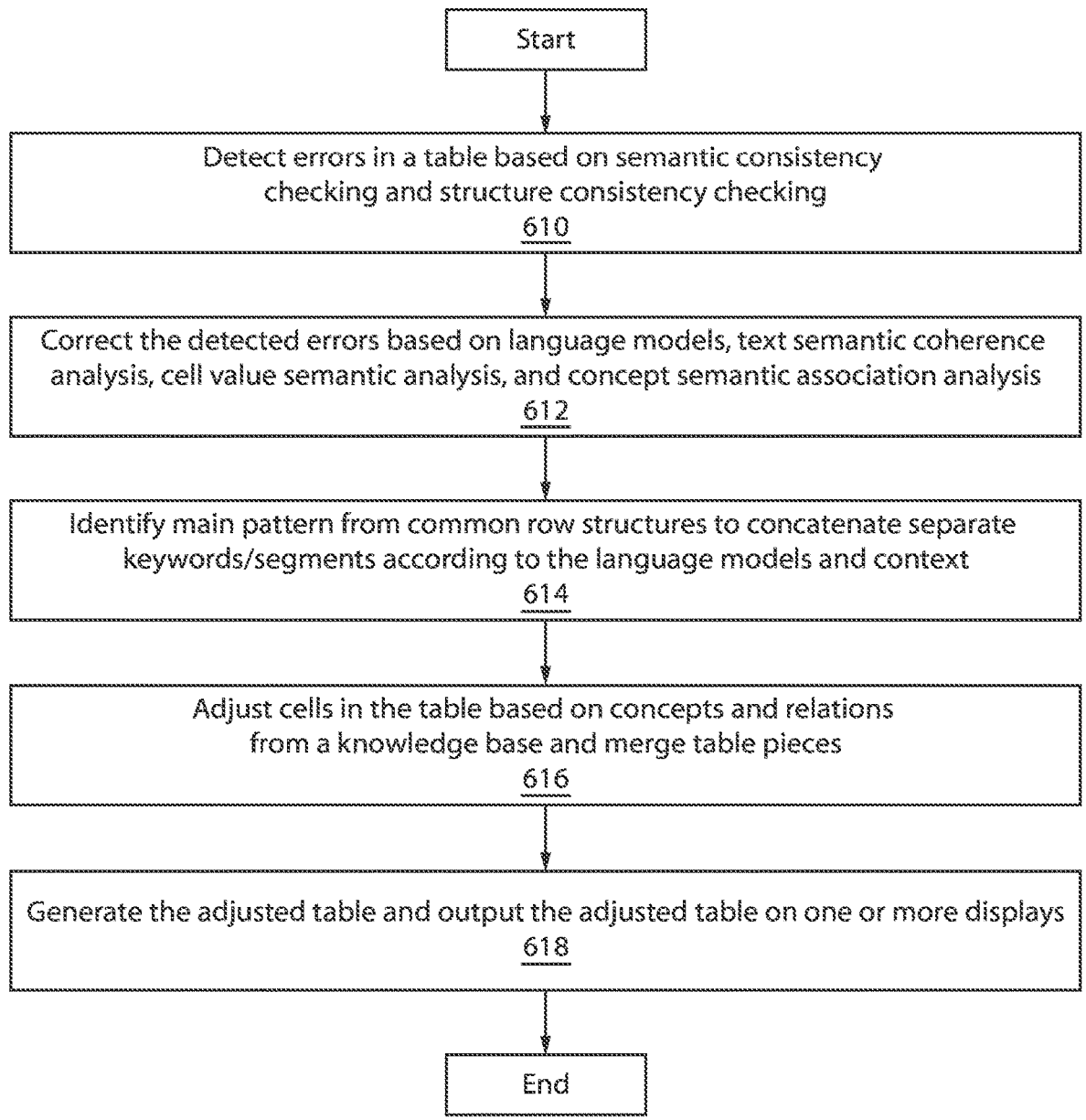
FIG. 6 is a block/flow diagram illustrating an example method for performing error correction in tables, in accordance with an embodiment of the present invention.

FIG. 6 is a block/flow diagram illustrating an example method for performing error correction in tables, in accordance with an embodiment of the present invention.

At block 610, detect errors in a table based on semantic consistency checking and structure consistency checking.

At block 612, correct the detected errors based on language models, text semantic coherence analysis, cell value semantic analysis, and concept semantic association analysis.

At block 614, identify main pattern from common row structures to concatenate separate keywords/segments according to the language models and context.

At block 616, adjust cells in the table based on concepts and relations from a knowledge base and merge table pieces.

At block 618, generate the adjusted table and output the adjusted table on one or more displays.

Figures 7, 8:
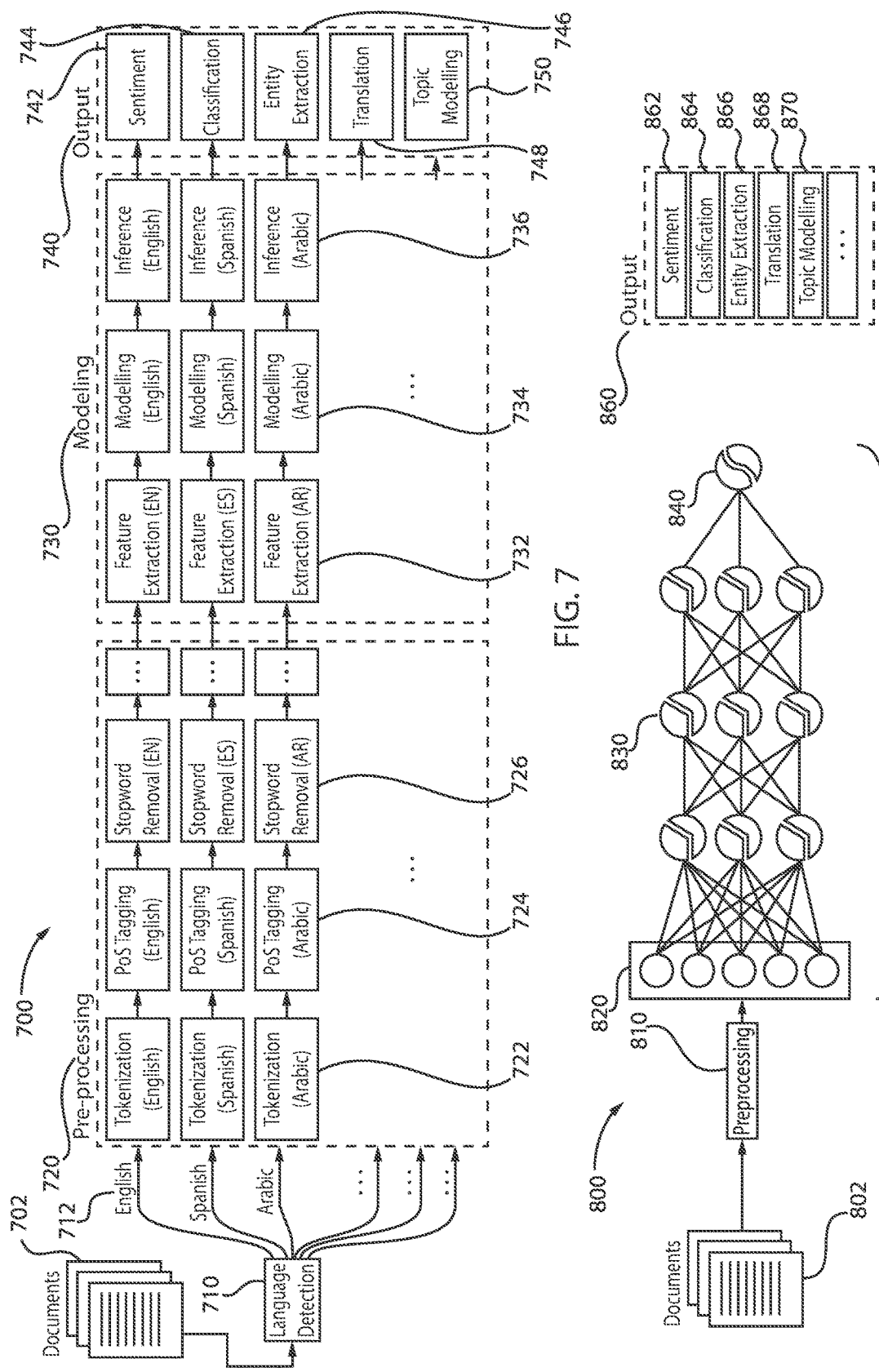
FIG. 7 is a block/flow diagram illustrating an example natural language processing (NLP) system employed in error correction of tabular data, in accordance with an embodiment of the present invention.
FIG. 8 is a block/flow diagram illustrating an example natural language processing (NLP) system employing deep learning for error correction of tabular data, in accordance with an embodiment of the present invention.

FIG. 7 is a block/flow diagram illustrating an example natural language processing (NLP) system employed in error correction of tabular data, in accordance with an embodiment of the present invention, whereas FIG. 8 is a block/flow diagram illustrating an example natural language processing (NLP) system employing deep learning for error correction of tabular data, in accordance with an embodiment of the present invention.

Once the content have identified, extracted, and cleansed, the next step is to have an understanding of that content. In many use cases, the content with the most important information is written down in a natural language (such as English, German, Spanish, Chinese, etc.) and not conveniently tagged. To extract information from this content, a user needs to rely on some levels of text mining, text extraction, or possibly full-up natural language processing (NLP) techniques.

NLP is a way for computers to analyze, understand, and derive meaning from human language in a smart and useful way. By utilizing NLP, developers can organize and structure knowledge to perform tasks such as automatic summarization, translation, named entity recognition, relationship extraction, sentiment analysis, speech recognition, and topic segmentation.

In the instant case, NLP can be employed to repair or correct tabular data that is being converted from one format to another format. The NLP can employ training data. The training data is data obtained from candidate tables. The candidate tables can be found in a plurality of different online and offline sources. For example, textbooks, publications, financial data, medical records, etc.

For purposes of the following description, it will be assumed that the mechanisms of the illustrative embodiments will be applied to table data structures embedded or otherwise associated with a document in a corpus of information for the purpose of performing natural language processing on the table data structure. However, it should be appreciated that this is only one possible implementation and the mechanisms of the illustrative embodiments are not limited to such. Rather, the scope of the illustrative embodiments of the present invention is intended to encompass any table data structure and any processing operation that can be applied to a corrected table data structure including, but not limited to, table data structures embedded in documents and NLP operations being applied to corrected table data structures.

Using NLP as an example processing operation to be applied to a table data structure, the illustrative embodiments recognize that documents subjected to NLP commonly include tabular data, to wit, content in the form of one or more tabular data structures (tables). A cell of a table is a containing unit within a table, such that the contents of the cell can be uniquely identified by a row and column or other suitable coordinates of the table.

The illustrative embodiments recognize that information presented within the cells of a table often relates to information in other cells of the same table, cells of a different table in the same document, or cells of a different table in a different document. The relationships between the information included in different cells is important for understanding the meaning of the tabular data, and generally for understanding the meaning of the document as a whole.

The illustrative embodiments recognize that specialized processing or handling is needed in NLP for interpreting the tabular data correctly and completely.

Moreover, the illustrative embodiments recognize that tables within electronic documents can include incorrect or missing information due, for example, to faulty optical character reading (OCR) scan operations, corrupted data, incorrect data entry by human beings, or any other possible source of error. Furthermore, these tables can include information that is critical for understanding the document in general and thus, it is important to correct the information wherever possible.

In one example, FIG. 7 illustrates documents 702 provided to a language detection module 710. The language detection module 710 determines what language the documents 702 are written in. In the pre-processing module 720, the documents 702 are separated by language (e.g., English, Spanish, Arabic, etc.) and then processed. The preprocessing module 720 includes a tokenization component 722, a part-of-speech (PoS) tagging component 724, and a stop-word removal component 726. After preprocessing module 720 has been implemented, the next steps is to employ a modeling module 730. The modeling module 730 includes a feature extraction component 732, a modelling component 734, and an inference component 736. The modeling module 730 then provides an output 740. The output 740 includes sentiment analysis 742, classification 744, entity extraction 746, translation 748, and topic modeling 750.

In another example, FIG. 8 illustrates an NLP system employing deep learning where documents 802 are provided to a pre-processing module 810. The processing then proceeds to a deep learning component 850. Deep learning component 850 includes input units 820 (for dense embedding), hidden layers 830, and output unit 840. The output unit 840 includes sentiment analysis 862, classification 864, entity extraction 866, translation 868, and topic modeling 870.

The exemplary embodiments of the present invention can employ NLP techniques of FIGS. 7 and 8 to convert tabular data from a first format to a second format with no or minimal errors.

Figure 9:
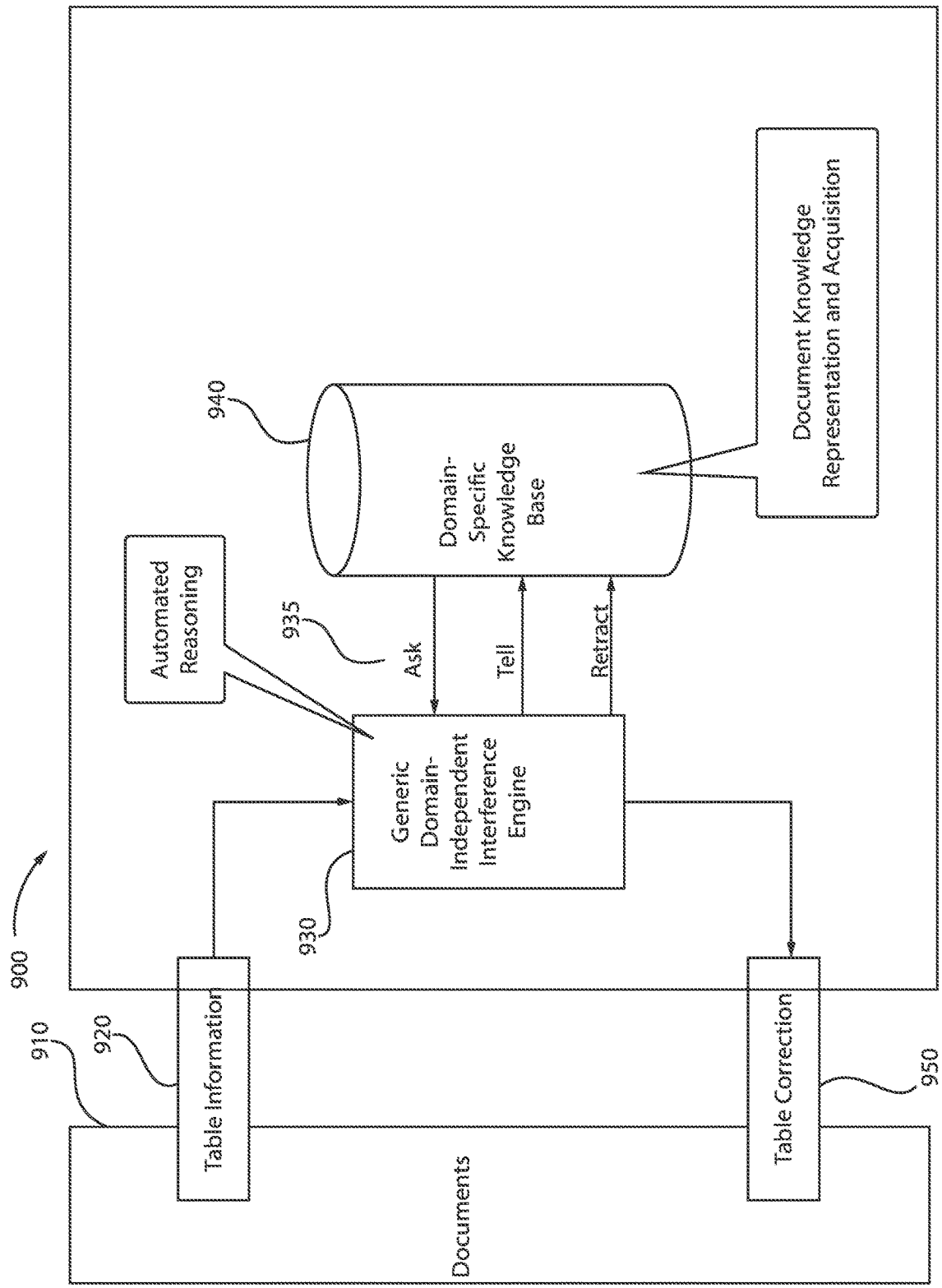
FIG. 9 is a block/flow diagram illustrating an example domain-specific knowledge database employed in error correction of tabular data, in accordance with an embodiment of the present invention.

FIG. 9 is a block/flow diagram illustrating an example domain-specific knowledge database employed in error correction of tabular data, in accordance with an embodiment of the present invention.

The knowledge-based agent 900 identifies knowledge about the decision domain, represents it using a formal language which it is possible to perform automated reasoning, and implements (or reuses) an inference engine that performs such reasoning. The knowledge-based agent 900 can ask, tell, and retract from environment sensors domain-specific knowledge, and can employ independent inference engine knowledge representation and automated reasoning acquisition.

The term "knowledge" can be data, information or abstraction formatted in a way that allows a human or machine to reason with it, deriving from it new data, information or abstraction. The term "reasoning" can be a systematic mechanism to infer or derive new knowledge from new percepts and/or prior knowledge.

In particular, table information 920 needs to be extracted from documents 910. A generic domain-independent inference engine 930 can be employed for automated reasoning. The domain-independent inference engine 930 communicates 935 with a domain-specific knowledge database 940 to ask, tell, and retract data or information or knowledge. The domain-specific knowledge database 940 takes advantage of document knowledge representation and acquisition techniques. The domain-specific knowledge database 940 can thus help in table correction 950 when converting tables or tabular data from one format to another format. The domain-specific knowledge database 940 can include knowledge data from, e.g., prior detected errors found in tabular data. This can be considered as training data or learning data.

The training data can be collected from scanning documents including correct table formats and correct table information and correct table presentations. The training data can be collected from textbooks, publications, websites, digital documents, financial filings, medical records, etc. Knowing what needs to be predicted will help in deciding which data can be more valuable to collect. In the instant case, the data to be collected is tabular data presented without any errors. Therefore, the training data are formulated from tables as a whole. Moreover, when formulating the issue, data exploration can be conducted in view of classification, clustering, regression, and ranking approaches.

As a broad subfield of artificial intelligence, machine learning is concerned with the design and development of algorithms and techniques that allow computers to "learn." At a general level, there are two types of learning: inductive, and deductive. Inductive machine learning methods extract rules and patterns out of massive data sets. The major focus of machine learning research is to extract information from data automatically by computational and statistical methods, hence, machine learning is closely related to data mining and statistics. Embodiments of machine learning can appear in "supervised adaption" and "adaption of algorithms" to evaluate candidate tables from a plurality of sources and assign a score to each candidate table based on a variety of variables/parameters. Candidate tables can receive high scores if they include a plurality of rows, a plurality of columns, a plurality of data, less blank cells, are complex, etc. Such candidate tables can be automatically included in the training data employed by the NLP and the domain-specific knowledge database 940. In another embodiment, after a first round of approval, candidate tables can be subjected to a subject matter expert (SME). SMEs collectively validate and enhance selected data elements. When an SME receives a request, the SME considers the data element associated with the data request. The SME can make any revisions or corrections to the data that he or she determines to be necessary, based on the SME's familiarity with subject matter pertaining to the data. Thus, a second round of approval or validation can occur before the candidate tables are validated or verified to be incorporated into the training or learning database.

Therefore, a novel aspect is that besides structural information from the PDF code, and/or geometric analysis, the exemplary embodiments of the present invention use natural-language processing and domain-specific knowledge to repair tables employing training data or learning data. The exemplary embodiments of the present invention provide multilevel invalidation checking, including structure invalidation, value invalidation, and text invalidation. By leveraging the domain semantic knowledge, linguistic knowledge and text context clues, the exemplary methods can correct the errors by main structure pattern detection, keywords concatenation, cell location adjustment, table merging, and consolidation, etc.

As used herein, the terms "data," "content," "information" and similar terms can be used interchangeably to refer to data capable of being captured, transmitted, received, displayed and/or stored in accordance with various example embodiments. Thus, use of any such terms should not be taken to limit the spirit and scope of the disclosure. Further, where a computing device is described herein to receive data from another computing device, the data can be received directly from the another computing device or can be received indirectly via one or more intermediary computing devices, such as, for example, one or more servers, relays, routers, network access points, base stations, and/or the like. Similarly, where a computing device is described herein to send data to another computing device, the data can be sent directly to the another computing device or can be sent indirectly via one or more intermediary computing devices, such as, for example, one or more servers, relays, routers, network access points, base stations, and/or the like.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device.

The present invention can be a system, a method, and/or a computer program product. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to at least one processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks or modules. These computer readable program instructions can also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks or modules.

The computer readable program instructions can also be loaded onto a computer, other programmable data processing apparatus, or other device to cause a series of operational blocks/steps to be performed on the computer, other programmable apparatus or other device to produce a computer implemented process, such that the instructions which execute on the computer, other programmable apparatus, or other device implement the functions/acts specified in the flowchart and/or block diagram block or blocks or modules.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which includes one or more executable instructions for implementing the specified logical function(s). In some alternative implementations, the functions noted in the blocks can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This can be extended, as readily apparent by one of ordinary skill in this and related arts, for as many items listed.

Having described preferred embodiments of a system and method for error correction for tables in document conversion (which are intended to be illustrative and not limiting), it is noted that modifications and variations can be made by persons skilled in the art in light of the above teachings. It is therefore to be understood that changes may be made in the particular embodiments described which are within the scope of the invention as outlined by the appended claims. Having thus described aspects of the invention, with the details and particularity required by the patent laws, what is claimed and desired protected by Letters Patent is set forth in the appended claims.

What is claimed is:

1. A method for error correction of tabular data in document conversion, the method comprising: identifying errors from tabular data transformation by employing an error/invalidation checking module; and correcting the identified errors from the tabular data transformation by employing an error correction module, the error correction module comprising: identifying a main structure pattern from common row structures; concatenating separate keywords according to natural language processing models employing training data obtained from a plurality of candidate tabular data; adjusting cells in the tabular data based on a domain-specific knowledge database including the training data in combination with linguistic and semantic knowledge; merging partial tabular data pieces; and generating an adjusted table as output on a display of a computing device.

2. The method of claim 1, wherein the identified errors include at least meaningless cell text strings, incorrectly split text strings, incorrectly combined text strings, cell value inconsistencies, and structure inconsistencies.

3. The method of claim 1, wherein the error/invalidation checking module includes a structure invalidation checking component, a text invalidation checking component, and a value invalidation checking component.

4. The method of claim 1, wherein the error correction module includes a local correction proposer and a global correction decider.

5. The method of claim 1, wherein the adjusted table is further evaluated based on the following criteria: a weighted likelihood of remaining possible inconsistencies in the adjusted table and a number of changes needed to produce the adjusted table.

6. The method of claim 5, wherein the adjusted table is converted to a final table by employing a weighted sum of the criteria.

7. The method of claim 6, wherein, when the weighted sum is above a predetermined threshold, the final table is flagged to receive user input.

8. A non-transitory computer-readable storage medium comprising a computer-readable program executed on a processor in a data processing system for error correction of tabular data in document conversion, wherein the computer-readable program when executed on the processor causes a computer to perform the steps of: identifying errors from tabular data transformation by employing an error/invalidation checking module; and correcting the identified errors from the tabular data transformation by employing an error correction module, the error correction module comprising: identifying a main structure pattern from common row structures; concatenating separate keywords according to natural language processing models employing training data obtained from a plurality of candidate tabular data; adjusting cells in the tabular data based on a domain-specific knowledge database including the training data in combination with linguistic and semantic knowledge; merging partial tabular data pieces; and generating an adjusted table as output on a display of a computing device.

9. The non-transitory computer-readable storage medium of claim 8, wherein the identified errors include at least meaningless cell text strings, incorrectly split text strings, incorrectly combined text strings, cell value inconsistencies, and structure inconsistencies.

10. The non-transitory computer-readable storage medium of claim 8, wherein the error/invalidation checking module includes a structure invalidation checking component, a text invalidation checking component, and a value invalidation checking component.

11. The non-transitory computer-readable storage medium of claim 8, wherein the error correction module includes a local correction proposer and a global correction decider.

12. The non-transitory computer-readable storage medium of claim 8, wherein the adjusted table is further evaluated based on the following criteria: a weighted likelihood of remaining possible inconsistencies in the adjusted table and a number of changes needed to produce the adjusted table.

13. The non-transitory computer-readable storage medium of claim 12, wherein the adjusted table is converted to a final table by employing a weighted sum of the criteria.

14. The non-transitory computer-readable storage medium of claim 13, wherein, when the weighted sum is above a predetermined threshold, the final table is flagged to receive user input.

15. An apparatus for error correction of tabular data in document conversion, the apparatus comprising:
    an error/invalidation checking module to identify errors from tabular data transformation; and
    an error correction module to correct the identified errors from the tabular data transformation, the error correction module configured to:
        identify a main structure pattern from common row structures;
        concatenate separate keywords according to natural language processing models employing training data obtained from a plurality of candidate tabular data;
        adjust cells in the tabular data based on a domain-specific knowledge database including the training data in combination with linguistic and semantic knowledge;
        merge partial tabular data pieces; and
        generate an adjusted table as output on a display of a computing device.

16. The apparatus of claim 15, wherein the identified errors include at least meaningless cell text strings, incorrectly split text strings, incorrectly combined text strings, cell value inconsistencies, and structure inconsistencies.

17. The apparatus of claim 15, wherein the error/invalidation checking module includes a structure invalidation checking component, a text invalidation checking component, and a value invalidation checking component.

18. The apparatus of claim 15, wherein the error correction module includes a local correction proposer and a global correction decider.

19. The apparatus of claim 15, wherein the adjusted table is further evaluated based on the following criteria: a weighted likelihood of remaining possible inconsistencies in the adjusted table and a number of changes needed to produce the adjusted table.

20. The apparatus of claim 18, wherein the adjusted table is converted to a final table by employing a weighted sum of the criteria.

* * * * *